United States Patent
Gallego

(10) Patent No.: US 7,950,152 B2
(45) Date of Patent: May 31, 2011

(54) METHOD OF MOUNTING A BEARING BLOCK ON A MOUNTING PLATE

(75) Inventor: José Manuel Algüera Gallego, Aschaffenburg (DE)

(73) Assignee: Jost-Werke GmbH, Neu-Isenburg (DE)

( * ) Notice: Subject to any disclaimer, the term of this patent is extended or adjusted under 35 U.S.C. 154(b) by 853 days.

(21) Appl. No.: 11/901,516

(22) Filed: Sep. 18, 2007

(65) Prior Publication Data

US 2008/0066300 A1    Mar. 20, 2008

(30) Foreign Application Priority Data

Sep. 18, 2006   (DE) .................. 10 2006 044 421

(51) Int. Cl.
*B23P 11/00*   (2006.01)
*B62D 53/08*   (2006.01)
(52) U.S. Cl. .................. 29/897; 29/525.01; 29/525.02; 29/525.11; 29/446; 280/433
(58) Field of Classification Search .............. 29/897, 29/897.2, 897.312, 897.35, 446, 525.01, 29/525.02, 525.11; 280/433
See application file for complete search history.

(56) References Cited

U.S. PATENT DOCUMENTS 5,682,678 A * 11/1997 Gallagher et al. ......... 29/897.32

FOREIGN PATENT DOCUMENTS

| DE | 1 956 513 U | 3/1967 |
|----|----|----|
| DE | 25 37 929 A1 | 3/1977 |
| DE | 36 11 245 A1 | 10/1987 |
| DE | 83 08 064 U1 | 9/1988 |
| DE | 37 15 204 A1 | 11/1988 |
| DE | 41 35 288 A1 | 4/1993 |
| DE | 199 52 997 A1 | 5/2001 |
| DE | 100 44 059 A1 | 3/2002 |
| EP | 0 038 928 B1 | 11/1981 |
| EP | 0 062 271 A1 | 10/1982 |
| EP | 0 538 893 A1 | 4/1993 |
| EP | 047400 A2 * | 1/2006 |

OTHER PUBLICATIONS

German Language Office Action dated May 15, 2007 issued in corresponding German Patent No. de 10 2006 044 421.3.
List of Documents Considered to Be Relevant; European Search Report issued Nov. 28, 2007 for European Patent Application No. 07 11 5781.

* cited by examiner

*Primary Examiner* — Jermie E Cozart
(74) *Attorney, Agent, or Firm* — Flaster/Greenberg P.C.

(57) ABSTRACT

A method is described for the mounting of a bearing block of a coupling plate on a mounting plate, with the bearing block having a bridge-like shape, being provided with bores at its opposite front and rear ends to accommodate fixing screws and being kept in place on the mounting plate by means of the fixing screws, and the coupling plate engaging with the bearing block in a central area, with the attachment of the bearing block to the mounting plate comprising at least one additional form fitting element. The invention was based on the task of providing a secure attachment of a self-supporting bridge-like bearing block to a mounting plate even under the extreme operating forces that are to be expected. The task is solved in accordance with the invention by means of a method in which by tightening the fixing screw together with the at least one form fitting element causes a deformation of the mounting plate.

7 Claims, 3 Drawing Sheets

METHOD OF MOUNTING A BEARING BLOCK ON A MOUNTING PLATE

BACKGROUND OF THE INVENTION

1. Field of the Invention

Figure 1:
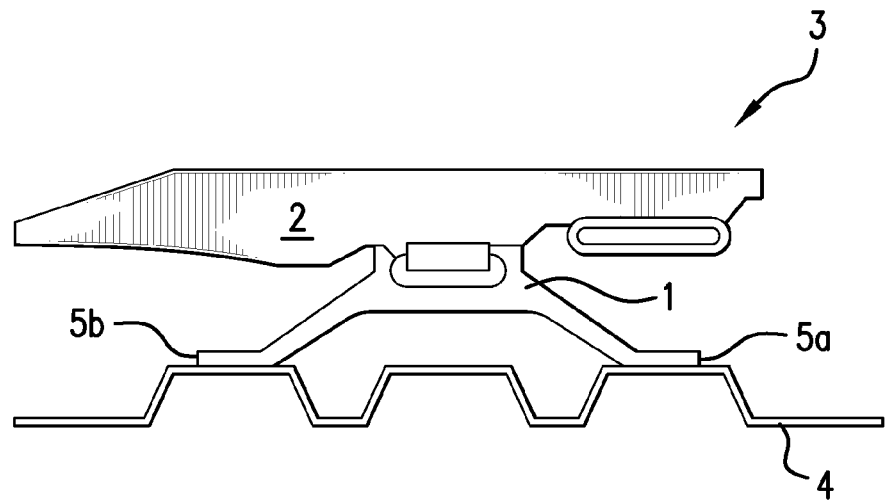

The invention relates to a method for the mounting of a bearing block of a coupling plate on a mounting plate, with the bearing block having a bridge-like shape, being provided with bores at its opposite front and rear ends to accommodate fixing screws, and being fixed in place on the mounting plate by means of the fixing screws and the coupling plate engaging in a central sector on the bearing block, with the attachment of the bearing block to the mounting plate comprising at least one additional form fitting element.

The coupling plate, together with a locking mechanism attached thereto and the bearing blocks, form the fifth-wheel coupling of a towing vehicle.

The mounting plate is screwed to a vehicle chassis and supports the two bearing blocks arranged on the side of the coupling plate, with the latter being firmly screwed to the mounting plate by means of the fixing screws. This screw connection must be arranged in such a way that it will permit a sufficient pre-load force in order to create a high normal force between the underside of the bearing block and the bearing surface of the mounting plate and a permanent friction fit resulting therefrom. This friction fit must be maintained in spite of the forces occurring during driving operation, in particular of any transverse forces while negotiating curves and during braking actions 2. Description of Related Art From DE 199 52 997 A1, for example, a bearing block is known that does not deform during a vertical stress, or only minimally so. These bearing blocks known from the state of the art are self-supporting. In most cases, their underside represents a straight line so that in the case of vertical stress the bearing block can rest uniformly on the mounting plate via its line-like contact surface. Therefore, the fixing screws used to this end must only absorb the vertical forces that result from their pre-stressing, as well as any operating forces that result when traction forces act upward on the fifth-wheel coupling.

However, such a mounting of the bearing block on the mounting plate is hardly suitable for novel bearing blocks that are not disposed of a straight continuous bearing surface on their underside but that merely bear on the area of the screw connection and that are designed to be self-supporting in their central area and at a distance to the mounting plate. Therefore they can not rest on the mounting plate at the location where according to experience the strongest vertical forces occur, namely in the center. If these bearing blocks are subjected to a lot of stress, they deform to a high degree due to a lack of support in the center, i.e. they bend downward. Due to this fact, both ends of the bearing block will try to give way towards the front and the rear, and very strong horizontal forces occur due to the geometric conditions even with minor vertical forces. In order to absorb these horizontal forces, the tightening torque of the screws that ultimately ensure the friction fit would have to be increased considerably. This, however, is not possible without any problems based on the load-bearing ability of the materials and the available installation spaces. With the high transversal forces that occur during driving operation, this design may lead to a dislocation of the bearing block and, over time, to a loosening of the screw connection as a result thereof. The fifth-wheel coupling could separate from the mounting plate, causing the semi-trailer to do the same from the towing vehicle.

From DE 41 35 288 A1 it has become known to design structures complementary to each other at the bearing blocks and at a headroom adapter attached to the mounting plate to absorb the occurring forces. When the bearing blocks are put in place, the structures intended for each other engage with each other as planned. However, the insertion of the structures designed as casting parts into the bearing blocks or, respectively, into the headroom adapter will lead to a considerable technical effort and correspondingly high costs.

BRIEF SUMMARY OF THE INVENTION

Accordingly, the invention is based on the task of providing a secure fastening of a self-supporting bridge-like bearing block to a mounting plate even under the maximal operating forces to be expected and at low manufacturing costs.

The task is solved in accordance with the invention by means of a method in which a deformation of the mounting plate is brought about by tightening fixing screws together with at least one form fitting element.

In this context, the at least one form fitting element can be formed directly on the bearing block. This provides the advantage that during attachment of the bearing blocks to the mounting plate no additional small parts need to be kept at the ready.

It has turned out to be particularly advantageous to arrange the at least one form fitting element at the underside of the bearing block. The underside of the bearing block is to be understood as the end-side areas of the bearing blocks that contact with the mounting plate.

Preferably, the at least one form fitting element is an annular projection projecting opposite the underside of the bearing block. When the fixing screw is tightened, the firmer annular projection presses into the upper surface of the underlying mounting plate and engages with it effectively upon completion of the assembly.

The annular projection should be arranged concentrically around at least one of the bores. For a particularly secure connection, an annular projection should preferably, in most cases, be formed around each of the six fixing screws.

Alternatively to the embodiment described above, the at least one form fitting element may be a recess arranged concentrically around a bore to the effect that a nut attached to the fixing screw presses the area of the mounting plate located below the recess into the latter. Hence, this creates an additional upward form fit between the mounting plate and the bearing block by means of a sectional shaping of the mounting plate.

Preferentially, the recess is conically expanded downward and a nut is screwable onto the fixing screw from the side of the mounting plate turned away from the bearing block, with the nut being formed in a complementary shape to the recess on the side turned towards the mounting plate. This achieves a particularly tight fitting of the mounting plate against recess of the bearing block.

Advantageously, the at least one form fitting element may also be a protruding dome opposite the underside of the bearing block, causing the material of the mounting plate to be pressed in sectionally below the original level. However, to this end the dome is preferably arranged concentrically around at least one bore, and a nut can be screwed onto the fixing screw from the side turned away from the bearing block, with the nut being formed in a shape complementary to the dome on the side turned towards the mounting plate.

In another advantageous embodiment of the invention the form fitting element can be fitted between the bearing block and the mounting plate. In this embodiment, the shaping element is not connected to the bearing block in one piece but rather as a separate component.

A beneficial arrangement comprises an indentation in the underside of the bearing block into which a disc provided with an annular projection is inserted. In this context, the disc is inserted into the indentation with its upper level contact surface and the annular projection protruding downward from the indentation. The indentation provides for a lateral fixation of the disc during the assembly as well as during driving operation. During the assembly, the annular projection pushes into the material of the mounting plate while the nut is being tightened, thereby creating the form fit. However, in the embodiment described above, the latter takes place between the disc and the mounting plate and thus only indirectly between the bearing block and the mounting plate.

According to another preferred embodiment, a disc provided with a double-sided annular projection is placed between the underside of the bearing block and the mounting plate. In this case, there is no indentation for a lateral fixation of the disc, with this embodiment resulting in lower production costs during the manufacture of the bearing blocks. The lateral fixation of the disc occurs instead by means of the annular projection being pressed into the underside of the bearing block as well as into the upper side of the mounting plate.

The disc used for this embodiment should be made of a hardened steel, thereby ensuring a penetration into each surface of the mounting plate and/or of the bearing block. However, due to its construction separate from the bearing block, a special hardening of the disc is possible with little effort and expense since the discs can be machined separately.

With regard to its symmetry, the disc should be round and be arranged concentrically around at least one of the bores so that a uniform force is exerted upon each respective disc via the respective fixing screw and nut and a uniform penetration into the mounting plate and/or the bearing block occurs.

In an additional advantageous embodiment, the at least one form fitting element comprises an adaptor sleeve arranged between the bore and the fixing screw when it is thereby passing through. During the assembly, the adaptor sleeve is inserted, free of play, into the bore running through the bearing block and the mounting plate. The fixing screw, on the other hand, may pass within the adaptor sleeve and at a distance from it. In this construction arrangement, the transverse forces occurring during driving operation are absorbed by the sleeve. The fixing screw, on the other hand, merely absorbs the pre-stressing force and prevents the fifth-wheel coupling from lifting off when the fifth-wheel coupling is pulled upward.

BRIEF DESCRIPTION OF THE SEVERAL VIEWS OF THE DRAWING(S)

Figure 2:
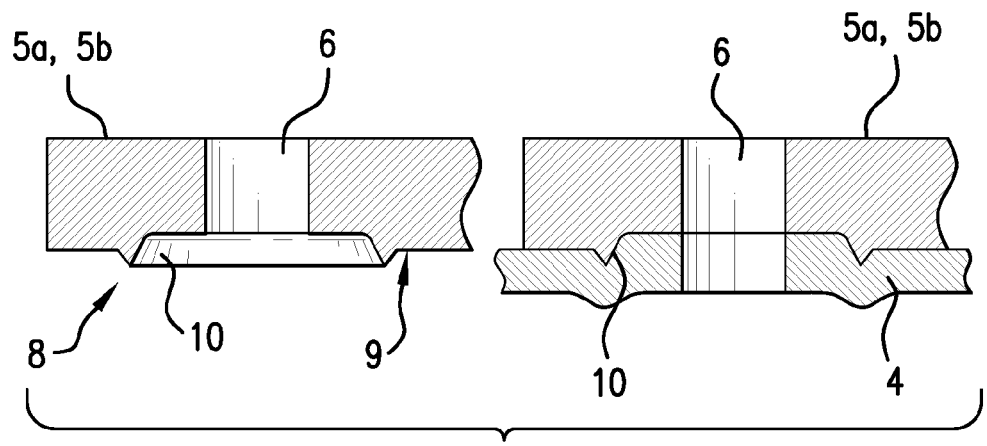
Figure 3:
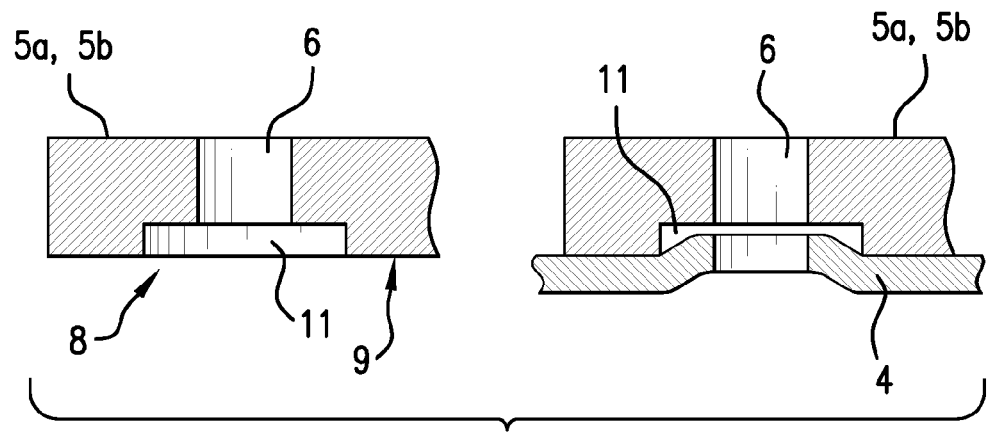
Figure 4:
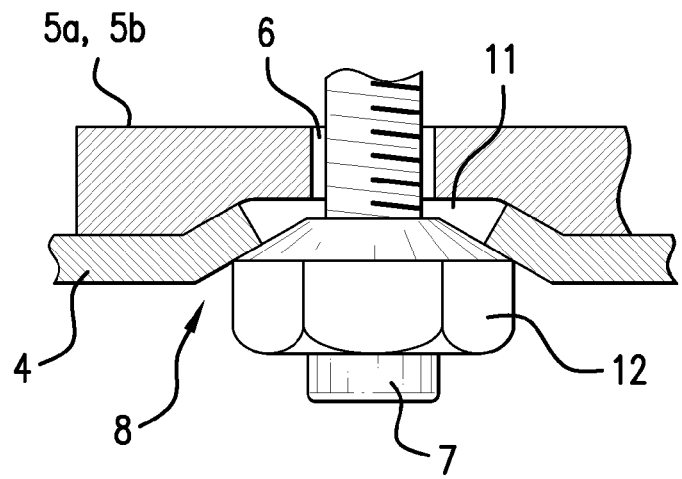
Figure 5:
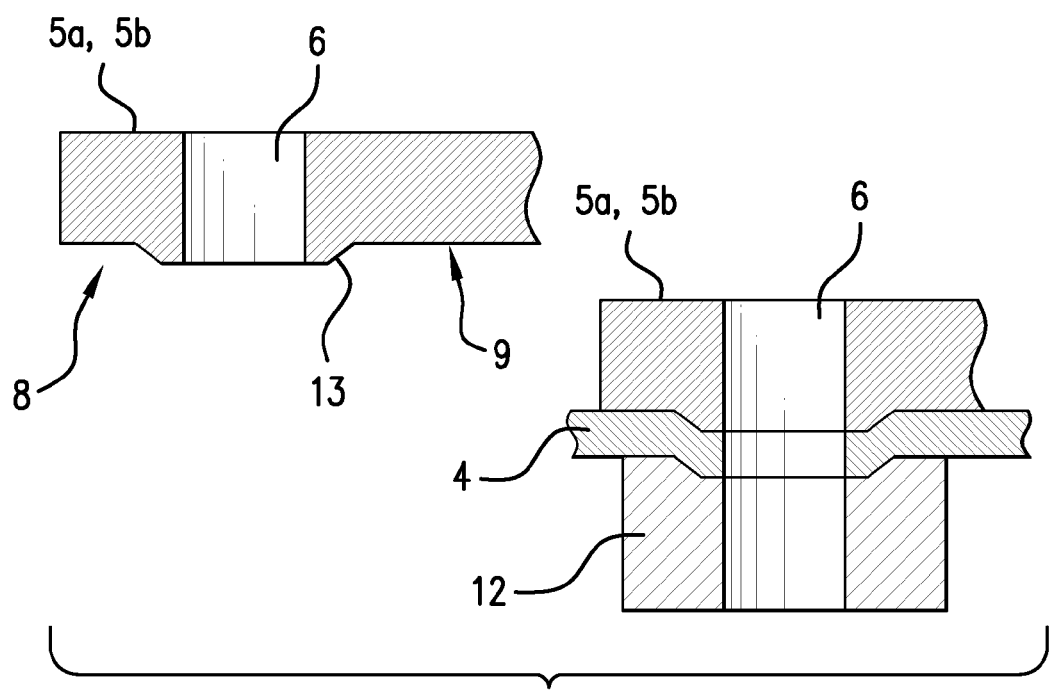
Figure 6:
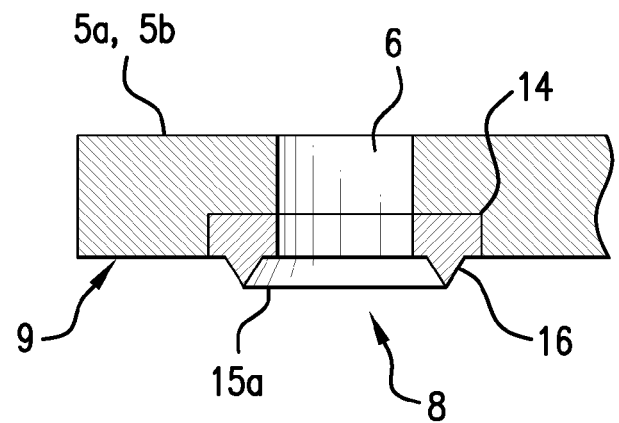
Figure 7:
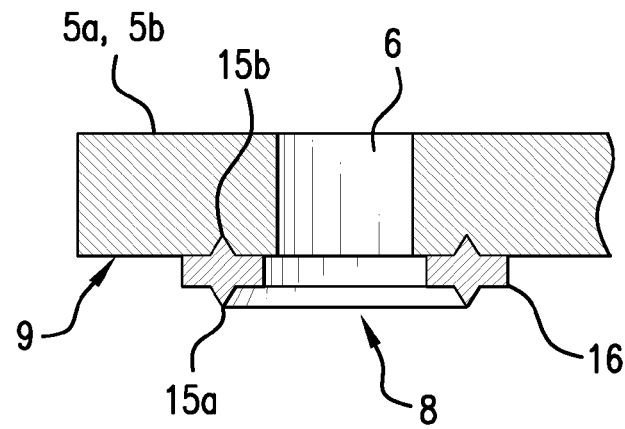
Figure 8:
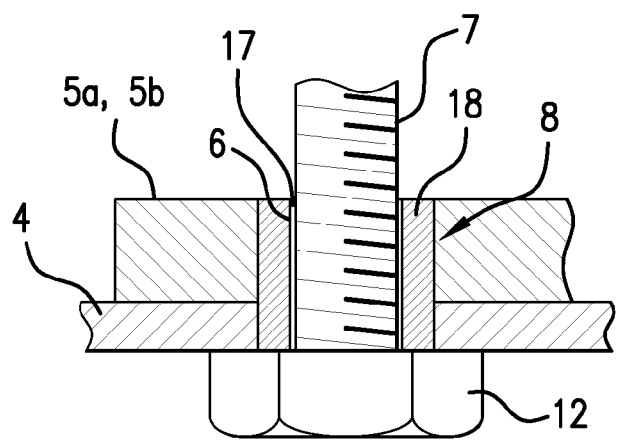

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings:

FIG. 1: a side view of a fifth-wheel coupling with a bearing block screwed onto a mounting plate;

FIG. 2: a cross section through the front or rear end of a bearing block having an annular projection formed on it, either before and after the assembly;

FIG. 3: a cross section through the front or rear end of a bearing block having a recess formed in it, before and after the assembly;

FIG. 4: a cross section through the front or rear end of a bearing block having a recess formed in it and a complementary nut, after the assembly;

FIG. 5: a cross section through the front or rear end of a bearing block having a dome formed on it and a complementary nut, after the assembly;

FIG. 6: a cross section through the front or rear end of a bearing block having an indentation with a disc inserted in it which has an annular projection, before the assembly;

FIG. 7: a cross section through the front or rear end of a bearing block with a disc having double-sided annular projections, and FIG. 8: a cross section through the front or rear end of a bearing block with an adaptor sleeve set into the bore;

DETAILED DESCRIPTION OF THE INVENTION

FIG. 1 shows a fifth-wheel coupling 3 comprising a coupling plate 2 and two bearing blocks 1 supporting the coupling plate 2, of which only the front bearing block 1 is visible in the side view. The bearing blocks 1 have a bridge-shaped, inverted U-form and rest with their front end 5a and their rear end 5b on a mounting plate 4 which in turn is screwed to a vehicle chassis (not shown). The coupling plate 2 engages with the bearing blocks 1 in a central area between the front and rear ends 5a, 5b. This central area is vertically distanced from the mounting plate 4.

The fastening of the bearing block 1 occurs in each case by means of bores 6 in the front and rear ends 5a, 5b into which fixing screws 7 are inserted and tightened with a nut 12, as can be seen particularly well in FIG. 4.

FIG. 2 shows a cross section through a front or rear end 5a, 5b of a bearing block 1 before and after its assembly to a mounting plate. On the underside 9 of the front or rear end 5a, 5b, an annular projection running concentrically around the bore 6 is formed as a form fitting element 8 for in addition of the fixing screws 7. In this context, the area of the underside 9 lying within the annular projection 10 is preferably recessed to provide additional free installation space into which material of the mounting plate 4 can be pressed. The impression of the annular projection 10 occurs by tightening the fixing screw 7 (not shown here) placed into the respective bore 6 and/or its nut.

FIG. 3 shows an alternative embodiment in which a pot-shaped recess 11 in lieu of an annular projection is formed as an additional form fitting element 8 around the bore 6 on the underside 9 of the front or rear end 5a, 5b. When the nut 12 (not shown) is tightened on the fixing screw, the mounting plate 4 which in this area is originally designed to be plate-like deforms convexly in the direction of the recess 11, thereby producing a form fit between the mounting plate 4 and the recess 11.

In FIG. 4, the recess 11 is provided with funnel-shaped expanded lateral walls. The nut 12 twisted onto the fixing screw 7 has a conically tapering shape complementary to the side walls of the recess 11 and thereby provides for a particularly effective shaping process of the mounting plate 4.

FIG. 5 represents an additional alternative embodiment with a form fitting element 8 which protrudes convexly as a dome 13 opposite the underside 9 and which interacts with a nut 12 especially adjusted thereto. The nut 12 has on its side turned towards the mounting plate 4 a concave upper side complementary to the shape of the dome 13. When the nut 12 on the fixing screw is tightened, a downward bulging of the mounting plate 4 occurs in this section.

In the embodiments of FIGS. 6 and 7, the form fitting element 8 is not an integral component of the front and/or rear end 5a, 5b of the bearing block 1 but is placed as a separate component between the bearing block 1 and the mounting plate 4 prior to the assembly.

To this end, in the embodiment according to FIG. 6, an indentation 14 is formed on the underside 9. However, in contrast with the embodiments of FIGS. 3 and 4, it does not serve the shaping process of the mounting plate 4 but rather to accept and laterally fix a disc 16 having an annular projection 15a formed in the direction of the mounting plate. During the tightening of a fixing screw 7 set in the bore 6 via a nut 12 (both not shown here), the annular projection 15a is pressed into the mounting plate 4, thereby creating a form fit.

In the embodiment of FIG. 7, the bearing block has a planar underside 9 prior to its installation. A disc 16 is then placed as a separate component on this, which disc comprises, in addition to the annular projection 15a directed downward, an additional identically constructed annular projection 15b directed upward. During the tightening of the fixing screw 7 and the nut (both not shown in FIG. 7), the lower annular projection 15a presses into the mounting plate 4 and the upper annular projection into the underside 9 of the end 5a, 5b.

FIG. 8 clarifies another possibility of an additional form fitting element 8 in the form of a adaptor sleeve 18 that is set, free of play, into the bore 6 and which reaches through the front or, respectively, rear end 5a, 5b of the bearing block as well as through the mounting plate.

The adaptor sleeve 18 abuts, free of play, the walls of the bore 6. To this end it may be necessary to detachably connect the bearing block 1 and mounting plate 4 components with each other during the manufacturing process and to insert the bore 6 in one operating step through the bearing block 1 and the mounting plate 4 or, respectively, to finish it later. In contrast, an annular gap 17 should remain between the fixing screw 7 and the adaptor sleeve 18.

LIST OF REFERENCE NUMBERS

1 Bearing block
2 Coupling plate
3 Fifth-wheel coupling
4 Mounting plate
5a Front end of the bearing block
5b Rear end of the bearing block
6 Bore
7 Fixing screw
8 Form fitting element
9 Underside of the bearing block
10 Annular projection
11 Recess around the bore
12 Nut
13 Dome
14 Indentation
15a, b Annular projections
16 Disc
17 Annular gap
18 Adaptor sleeve It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method for mounting a bearing block of a coupling plate on a mounting plate, the bearing block having a bridge-like shape and being provided with bores at opposite front and rear ends of the bearing block to accommodate fixing screws, and the bearing block being fixed in place on the mounting plate by means of fixing screws, the coupling plate engaging with the bearing block in a central area, wherein the attachment of the bearing block to the mounting plate comprises at least one form fitting element, the method comprising tightening the fixing screws together with the at least one form fitting element to cause a deformation of the mounting plate.

2. The method according to claim 1, wherein the at least one form fitting element is an annular projection protruding opposite of an underside of the bearing block, such that when the fixing screw is tightened the firmer annular projection is pressed into an upper surface of the underlying mounting plate and interacts with the mounting plate after completion of assembly.

3. The method according to claim 1, wherein the at least one form fitting element is a recess arranged concentrically around at least one bore and a section of the mounting plate located below the recess is pressed into the recess when a nut situated on the fixing screw is tightened.

4. The method according to claim 3, wherein the recess is conically expanded downward and a nut is screwed onto the fixing screw from a side of the mounting plate turned away from the bearing block, with the nut being formed in a complementary shape to the recess on a side turned towards the mounting plate.

5. The method according to claim 1, wherein the at least one form fitting element is a dome protruding opposite an underside of the bearing block by which material of the mounting plate is pressed sectionally below an original level.

6. The method according to claim 1, wherein the at least one form fitting element is a separate component fitted between the bearing block and the mounting plate.

7. The method according to claim 1, wherein the at least one form fitting element comprises an adaptor sleeve arranged between the bore and the fixing screw when the fixing screw is passing therethrough, wherein the sleeve is inserted, free of play, during assembly into the bore running through the bearing block and the mounting plate.

* * * * *